(12) United States Patent
Sekiya

(10) Patent No.: US 6,259,824 B1
(45) Date of Patent: Jul. 10, 2001

(54) IMAGE PROCESSING APPARATUS UTILIZING A NEURAL NETWORK TO IMPROVE PRINTED IMAGE QUALITY

(75) Inventor: Toshiyuki Sekiya, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/848,876

(22) Filed: Mar. 10, 1992

(30) Foreign Application Priority Data

Mar. 12, 1991 (JP) .................................................. 3-046368
Mar. 6, 1992 (JP) .................................................. 4-049182

(51) Int. Cl.⁷ .............................. G06K 9/40; G06E 1/00
(52) U.S. Cl. .............................. 382/274; 382/156; 706/15
(58) Field of Search .............................. 395/800, 21, 24, 395/117; 355/245, 266, 56; 358/442, 443, 448, 80; 382/14, 156, 254, 274; 706/15

(56) References Cited

U.S. PATENT DOCUMENTS

| | | | |
|---|---|---|---|
| 4,354,756 | * 10/1982 | Arai et al. | 355/272 |
| 4,609,283 | * 9/1986 | Murata et al. | 355/208 |
| 4,711,560 | * 12/1987 | Hosaka et al. | 355/200 |
| 5,069,124 | * 12/1991 | Schneider | 101/142 |
| 5,109,275 | * 4/1992 | Naka et al. | 358/518 |
| 5,146,548 | * 9/1992 | Bijnagte | 395/117 |
| 5,162,899 | * 11/1992 | Naka et al. | 358/80 |
| 5,177,625 | * 1/1993 | Nakashima et al. | 358/468 |
| 5,295,197 | * 3/1994 | Takenaga et al. | 382/14 |
| 5,309,525 | 5/1994 | Shimomura et al. | 382/50 |
| 5,438,645 | * 8/1995 | Oyanagi | 395/24 |
| 5,490,236 | 2/1996 | Niki | 395/23 |
| 5,495,542 | 2/1996 | Shimomura et al. | 382/54 |

FOREIGN PATENT DOCUMENTS

| | | | |
|---|---|---|---|
| 0 461 902 A3 A2 | 12/1991 | (EP) | G06F/15/80 |
| 60-165667 | 8/1985 | (JP) . | |
| 60-207156 | 10/1985 | (JP) . | |
| 63-135961 | 6/1988 | (JP) . | |
| 64-046772 | 2/1989 | (JP) . | |
| 2-178758 | 7/1990 | (JP) . | |
| 2-201586 | 8/1990 | (JP) . | |

* cited by examiner

*Primary Examiner*—John A. Follansbee
(74) *Attorney, Agent, or Firm*—Morgan & Finnegan, LLP

(57) ABSTRACT

An information processing apparatus including a switch for manually requesting change of output image quality, detecting unit for detecting a condition of the apparatus, setting unit of setting an image forming condition in accordance with the detected condition and the requested output image quality and control unit for changing the image forming condition by learning the request previously requested by the user. Image forming conditions are adjusted so as to satisfy the user manually based upon the degree of satisfaction determined by the user.

11 Claims, 8 Drawing Sheets

IMAGE PROCESSING APPARATUS UTILIZING A NEURAL NETWORK TO IMPROVE PRINTED IMAGE QUALITY

RELATED COPENDING APPLICATIONS

U.S. Ser. No. 07/526,650 filed May 22, 1990
U.S. Ser. No. 07/673,240 filed Mar. 20, 1991
U.S. Ser. No. 07/713,141 filed Jun. 11, 1991
U.S. Ser. No. 07/713,312 filed Jun. 11, 1991.

BACKGROUND OF THE INVENTION

1. Field of the Invention

This invention relates to an information processing apparatus in which picture quality is capable of being adjusted at user's requirements.

2. Prior Art

In information processing apparatus such as copying machines and printers, generally a variety of measures are taken in order to maintain the quality of an outputted image at a fixed level. As one example, an apparatus of the aforementioned kind may be provided with control means for directly controlling picture quality, wherein control parameters are set in the control means in appropriate fashion. In addition, the apparatus may be equipped with various sensors in order to optimize the control parameters in conformity with changes in the environment in which the apparatus is used, wherein it is possible to perform highly sophisticated control of the type in which the control parameters are automatically adjusted to appropriate values frequently in dependence upon the outputs from the sensors. For example, in the case of an electrophotographic copying apparatus, control means for so-called development bias control is provided in order to make the copy density, which is an important factor in picture quality, conform to a fixed standard. The control means is so adapted as to set the bias value to a value which is appropriate.

It has recently become possible to perform development bias control more finely. Specifically, accordingly to such control, ambient temperature, ambient humidity, the density of an original document, etc., are sensed by sensors and the appropriate bias values are calculated based upon the sensor outputs in order to stabilize picture quality.

However, in the examples of the prior art described above, ordinarily the values of the control parameters are fixed values decided at the design stage and these cannot be changed following shipment of the apparatus from the factory. Furthermore, in a case where changes in environmental conditions are sensed by a plurality of sensors and the values of the appropriate control parameters are revised, the mapping relationship between the sensor output values and the appropriate control parameter values is decided at the design stage and this relationship does not change once it has been decided.

Accordingly, in order to achieve uniformity of quality in terms of picture quality and density, etc., as the final objective using the picture-quality control methods of the kind set forth above, a mean having some latitude is taken of the demands made by all users and the mean must be adopted as being representative of the appropriate value. Consequently, since the appropriate values are merely the representative values set at the time of shipment, there will always be some users who are dissatisfied with the picture quality obtained. A similar problem arises even in control for automatic adjustment of copy density for dealing with the density of the original document. Such control is employed widely in the latest copying machines. Specifically, the problem is that when the automatic adjustment function is implemented, copies always appear somewhat faint. Consequently, even though the automatic adjustment function is intended to be convenient, there are only a few users who make the adjustment manually rather than utilize the automatic adjustment function.

Further, in the case of a copying apparatus of the electrophotographic type, the parameters which affect picture quality are highly numerous and a variation in picture quality owing to the passage of time and slight differences in the characteristics of various components are unavoidable.

Thus, the conventional image forming apparatus still possess a variety of shortcomings.

SUMMARY OF THE INVENTION

Accordingly, an object of the present invention is to provide an image processing apparatus in which it is possible to set image forming conditions conforming to the state of the apparatus at use and in line with desired requirements.

According to the first aspect of the present invention, there is an information processing apparatus provided which comprises:

means for manually requesting change of output image quality;

detecting means for detecting a condition of the apparatus;

setting means for setting an image forming condition in accordance with the detected condition and the requested output image quality; and control means for changing the image forming condition by learning the request previously requested from the requesting means.

According to the second aspect of the present invention, there is provided an information processing apparatus which comprises:

means for requesting change of output image quality;

detecting means for detecting environmental parameter;

determining means for determining an image forming condition by computing detected environment-parameter;

learning means for memorizing the determined image forming condition by the determining means; and image recording initiating means for carrying out subsequent image recording utilizing the value learned.

According to the third aspect of the present invention, there is provided an information processing apparatus having image forming condition setting means for setting the desired image forming conditions and image forming means for forming the image under the set image forming conditions comprising:

satisfaction discriminating means for determining whether or not a user is satisfied with an output image by monitoring operation of the apparatus performed by the user;

environmental-parameter detecting means for detecting environmental-parameters;

control means for deciding the amount of adjustment based upon detection values outputted by said detecting means and;

a neural network provided in said image forming condition determining means for obtaining at least one image forming condition by performing computation of the environmental-parameter input adjusted by the control means;

whereby image forming conditions are adjusted so as to satisfy the user based upon the degree of satisfaction determined by said satisfaction discriminating means.

According to the fourth aspect of the present invention, there is provided an information processing apparatus comprising:

a neural network for processing an input information thereto on the basis of a predetermined connectivity constant and outputting processed information;

a control means for setting a connectivity constant to said neural network;

a memory means for storing a program for computing the connectivity constant to be set by said control means; and wherein said neural network, said control means and said memory means are arranged on a single substrate.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the accompanying drawings.

(First Embodiment)

Figure 1:
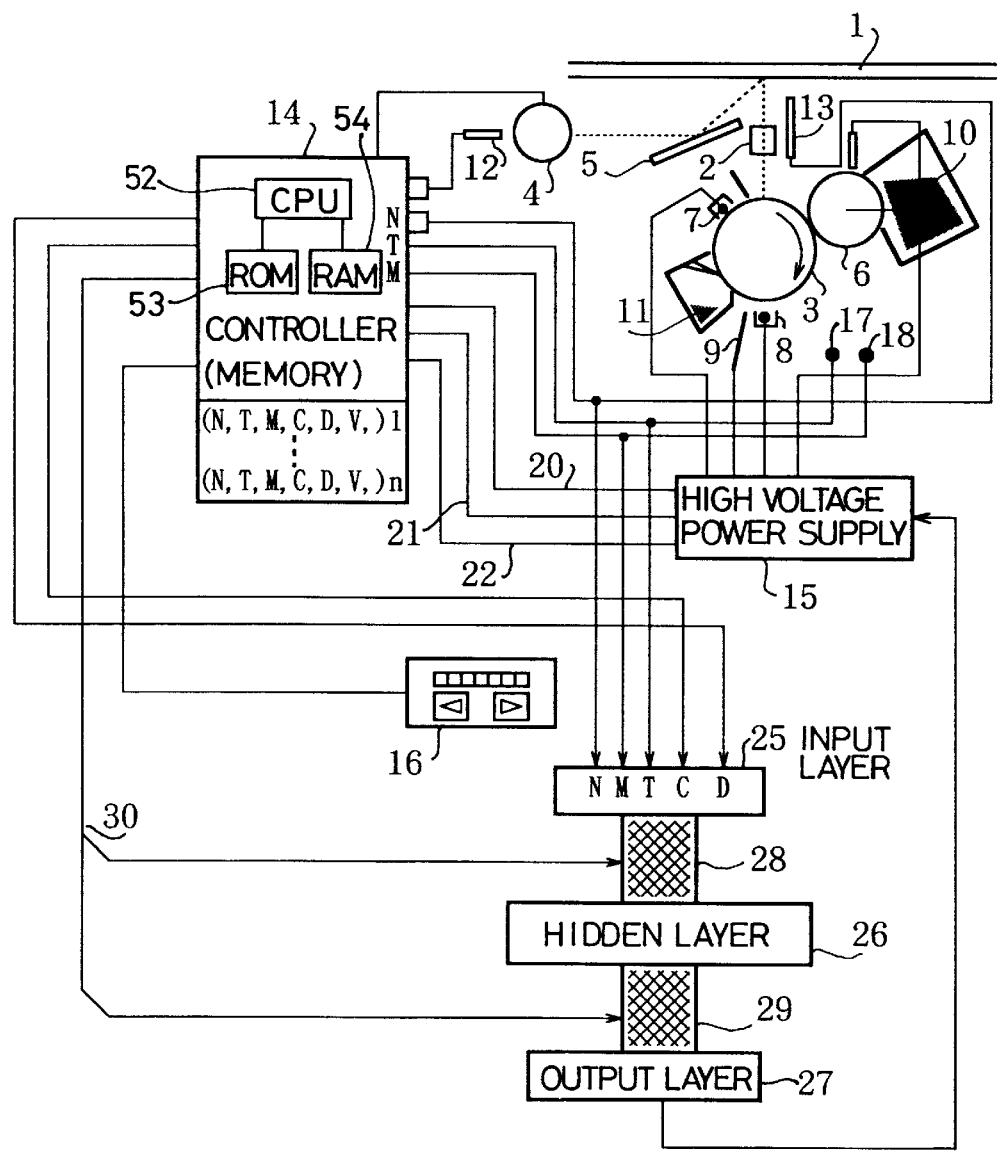
FIG. 1 is a block diagram illustrating a first embodiment of an information processing apparatus according to the present invention.

FIG. 1 is a block diagram illustrating a copying apparatus of a first embodiment in which the present invention is applied to a copying machine of the electrophotographic type.

As shown in FIG. 1, the apparatus includes a glass platen 1, an imaging lens 2, a photosensitive drum 3, a light source 4, a reflecting mirror 5, a developing drum 6, a primary corona charging device 7, a transfer charging device 8, a charge removing needle 9, an optical fiber 12 for detecting the amount of light from the light source 4, an optical fiber 13 for detecting the density of an original, and a controller 14 for controlling the overall system of the apparatus, which provides a microcomputer (CPU) 51, ROM 53 for storing therein a system control program, and RAM 54, which is used for the working area. Numeral 10 denotes toner, and numeral 11 represents toner waste.

The apparatus further includes a high-voltage power supply 15 for performing primary corona charging, development biasing, image transfer and charge removal, a control panel 16 having keys which the user operates to adjust copy density, as well as disable presentation keys, a temperature sensor 17 for sensing ambient temperature T, a humidity sensor 18 for sensing ambient humidity, a main operation signal line 20 of the high-voltage power supply 15, an ON-OFF operation signal line 21 for the AC portion of the development bias, and a control signal line 22 for controlling the value of the DC portion of development bias. The apparatus is provided with a neural network consisting of an input layer 25, a hidden layer 26, an output layer 27, a section 28 for the input connections, and a section 29 for the output connections.

Numeral 30 denotes a bus which sets weighting constants for the input and output connections 28 and 29.

In this embodiment, five items are set as various environmental parameters related to picture quality. These are original density N, ambient temperature T, ambient humidity M, total number C of copies, and number D of copies to be made in a fixed period of time. As means which the user may employ to adjust copied results to a desired picture quality, mention can be made of a density adjustment button. Such a button has two sides, one for increasing density and one for decreasing density. When the user does not press the button to either side, an amount of adjustment initially set by the controller is internally assigned and the control panel indicates neutral.

In the case of this embodiment, the adjustment of density is carried out by controlling the potential (the developing DC bias) of the developing drum. The amount of adjustment is decided by the neural network 25–29 based upon the environmental parameters.

Operation up to optimization of density will be described hereinafter with referring to a flow chart illustrated in FIG. 2. The control sequences performed by FIG. 2 is stored in memory ROM 53 of the controller 14.

Figure 2:
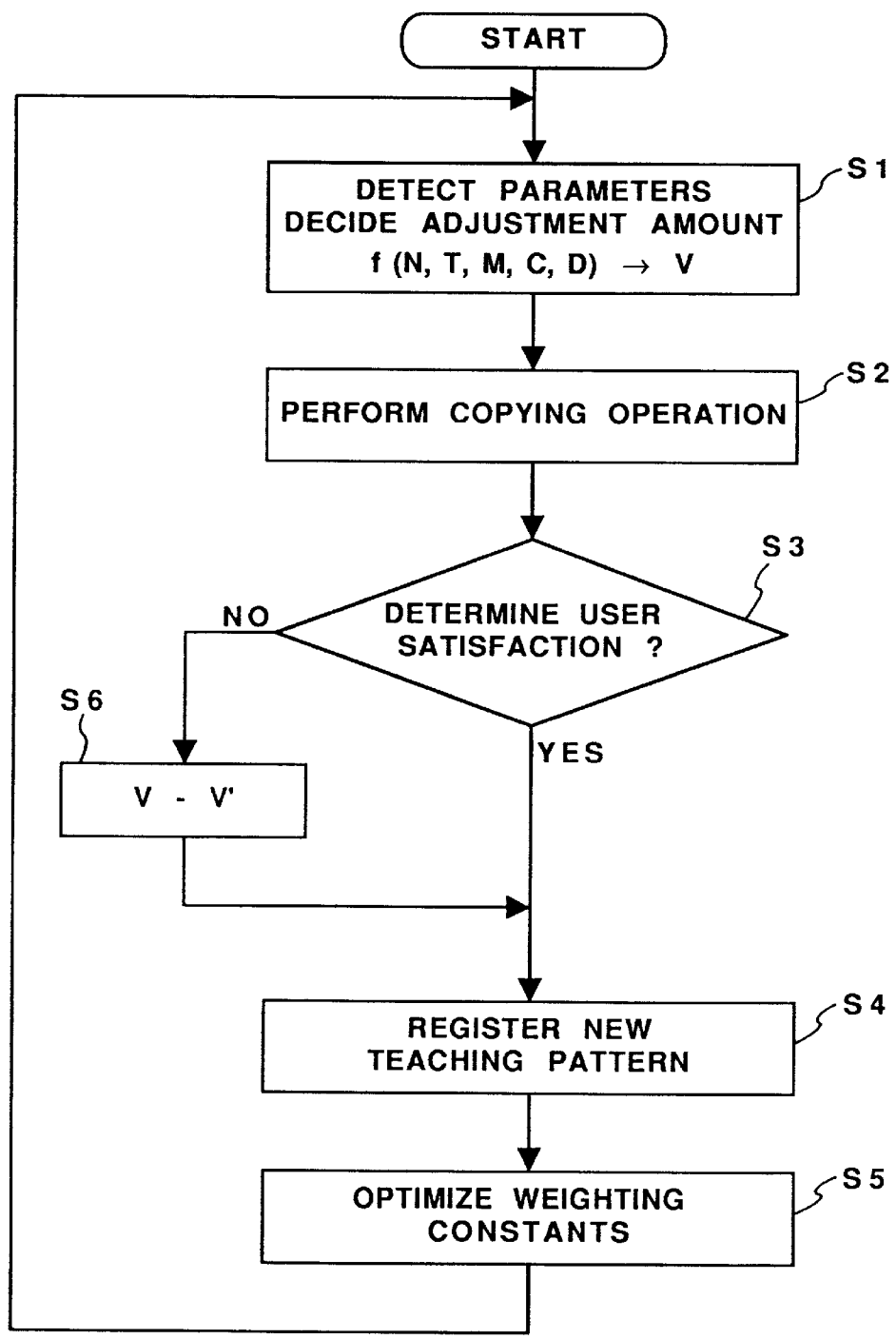
FIG. 2 is a flowchart for describing the operation of the invention.

First, an adjustment amount V for values of $f(N,T,M,C,D)$, which were determined by the previous copying operation, is outputted at step SI in the flowchart of FIG. 2 in accordance with a mapping relationship between environmental parameters and amount of adjustment decided previously, and the copying operation is started at step S2 of the flowchart. If the user is satisfied with the results of copying upon observing the results (YES at step S3), then the user continues copying or terminates the copying operation without using the adjustment button. On the other hand, if the user is not satisfied (NO at step S3) and adjusts density to the desired density by using the adjustment button, V' is substituted for the value of the adjustment amount at step S6 in FIG. 2. Next, at step S4, the set (N,T,M,C,D,V') of environmental parameters and amount of adjustment prevailing when it is judged that the user is satisfied is stored in memory (not shown), which is provided within the controller 14, as a first teaching pattern. Then, at step S5, a new weighting is reset for the input and output connections 28 and 29 of the neural network.

Next, on the basis of the teaching pattern registered previously, and the teaching pattern currently registered, the connectivity constants of the neural network 25–29 are optimized at step S5. In other words, the function f is updated.

The program then returns from step S5 to step S1, where copying starts being carried out at the new v so that it may be judged whether the revised density is satisfactory. When the desired density is reached, copying is continued as is or the copying operation is terminated. Accordingly, the amount of adjustment which the user finds satisfactory can be estimated through such a series of operations. When a teaching pattern is stored, in actuality a restriction is imposed by memory capacity. In any case, it would be necessary to introduce an algorithm for accumulating a fixed quantity of the latest patterns or for updating them in relation to those which satisfy certain conditions. There is no limitation as to which algorithm is used.

There are several well known algorithms for optimizing the connectivity constants of a neural network, one of which is the back-propagation method. There is no limitation as to which algorithm is used.

The general features of an electrophotographic process will now be described.

First, an original placed upon the glass platen 1 is irradiated with light emitted by the light source 4, and the reflected light is imaged upon the photosensitive drum 3 via the imaging lens 2. The photosensitive drum 3 is charged in advance by the primary corona charging device 7 and is sensitized in accordance with the imaged pattern so that a latent image of the electrostatic pattern is formed. The latent image is developed and rendered visible in toner by the developing drum 6. Next, the toner image is transferred from the photosensitive drum 3 to copy paper (not shown) by the transfer corona charging device 8. Thus, a series of copying operations is carried out. In this case, when the developing DC bias applied to the developing drum 6 from the high voltage power supply 15 is changed, the developing conditions change. Therefore, the amount of toner formed on the photosensitive drum 3 changes so that it is possible to change the copying density.

The optical fiber 13 is for detecting the density of the original. The amount of light reflected from the original is picked up by the optical fiber 13 so that it can be monitored as the density N of the original by the controller 14. The original density N, ambient temperature T and ambient humidity M are causes of short-term variation in the conditions of the electrophotographic process. The total number C of copies and the number D of copies made in a fixed period of time are causes of long-term variation in the electrophotographic process. Accordingly, the current value of N, T, M, C and D are monitored at all times by the controller 14. If the developing DC bias is controlled based upon the aforementioned variations, copying will always be performed at a stabilized image density.

Next, the neural network 25–29 will be described.

The input layer 25 provides analog values indicative of the values of (N, T, M, C, D), normalizes these values and sends them to the succeeding stage. The hidden layer 26, upon receiving weighting in accordance with weighting constants sent from the controller 14, accepts signals from the input layer 25. Furthermore, the output layer 17, upon receiving weighting in accordance with weighting constants sent from the controller 14, accepts signals from the hidden layer 26 and decides the firing state of each output element (not shown) as the result of processing based upon filtering threshold values. Moreover, the output layer 27 decides an amount of adjustment according to the set connectivity constant and outputs this to the high-voltage power supply 15 as an analog value.

The bus 30 is for setting the weighting constants, which have been decided by the controller 14, in the sections 28 and 29 for the input and output connections, respectively.
(Second Embodiment)

Figure 3:
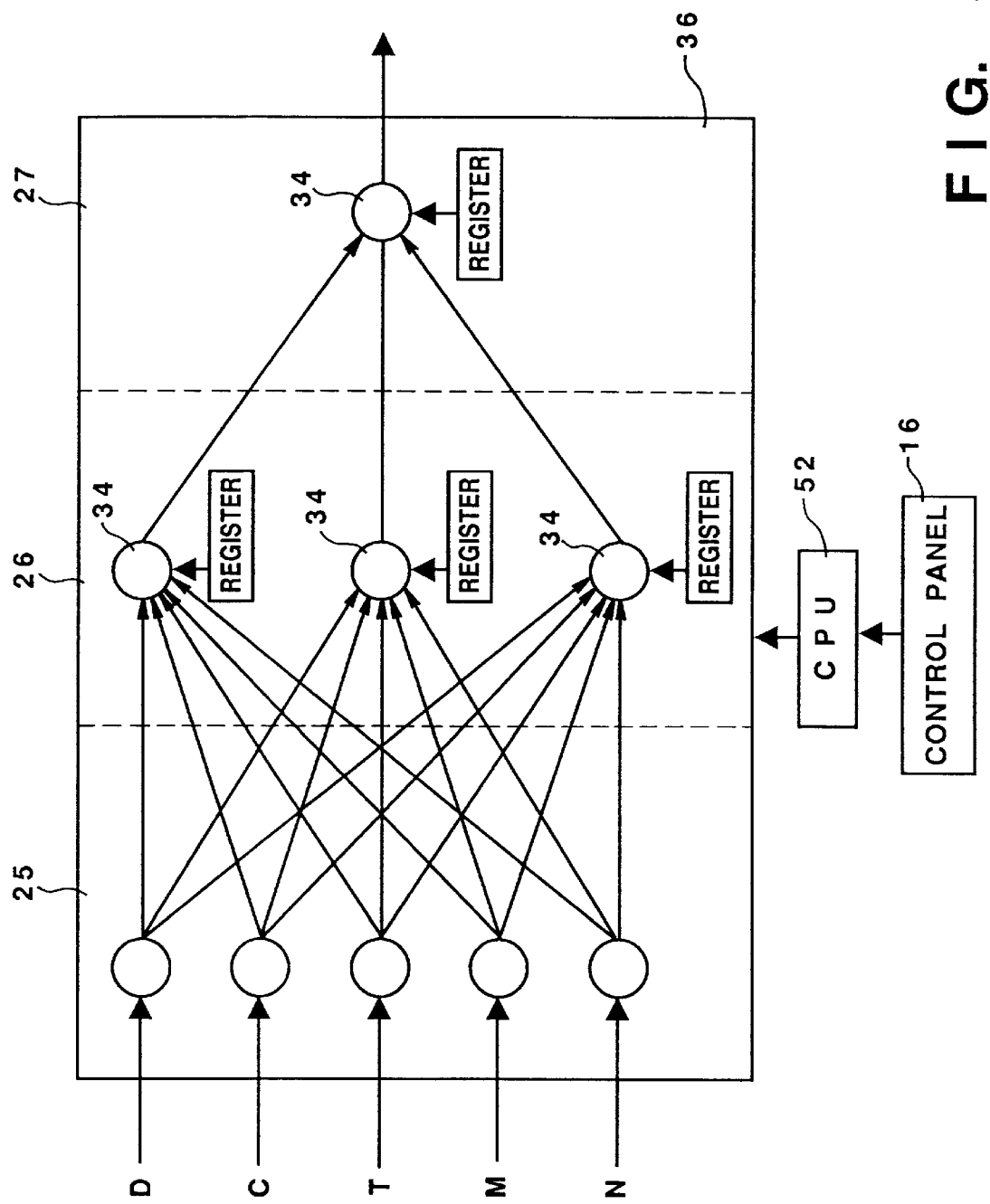
FIG. 3 is a block diagram showing the arrangement of neural network of FIG. 1 in greater detail.

Next FIG. 3 refers to a neural network for determining the image forming conditions and recording conditions.

The neural network and its peripheral comprises the operation panel 16 and CPU 52 which changes the connectivity constants initially set to default conditions and be subjected to modification, and also puts out a control signal to the charge voltage and developing voltage. The output of the CPU 52 is inputted to the neural network 36 to control neural units 34. This neural network 36 includes input layer 25, input/output connection (connective layer) layers 28 and 29, middle layer 26 and the output layer 27. Concerning the neural network 36, each computing unit 34 is provided with a register in which the connectivity constant is stored, replaceable by the computer 52. The neural network multiplies the stored connectivity constant to the input environmental parameters, and obtain the total value of the computation. Then, according to the appropriate algorithm, the final output is obtained and puts it out to the high voltage power supply 15. The neural network 36 consists of several neural units and is designed to put out the control signal for generating image generation conditions and recording conditions. Generally, the main function of the CPU is to set the connectivity constant to the register in the neural units 34 and replace them if required. Accordingly, if the user notifies the controller that recorded image density is too light or too dark, control panel 16 is used for input. Upon receipt of this request, the CPU 52 modify the neural unit 34 in neural network 36 for changing the conditions. Even if the same control signals are fed by CPU 52 to neural network 36, the result may be different. That is the output of the network becomes different and a different control signal is applied to the high voltage controller 15. Thus a different image recording may be expected. Repeating this routine until the user is satisfied with the recording result and upon receives the satisfaction that this connectivity constants is associated with, the input conditions are learned (inclusive of the connectivity contents) and stored.

However, the range of application of the invention is not limited to the foregoing. For example, if the present invention is utilized in a color copying machine, it can be applied to correction of color tone at the time of copying.

When the machine is shipped from the factory it is programmed with default values for the optimum connectivity constant. This constant may not give the best quality of copy at the installation location. Therefore means to adjust the constants and to adjust the quality of the copying, or a service person who is able to adjust the machine for that environs and then store the new values in ROM 14 for that environs, is provided for the user.

Figure 4:
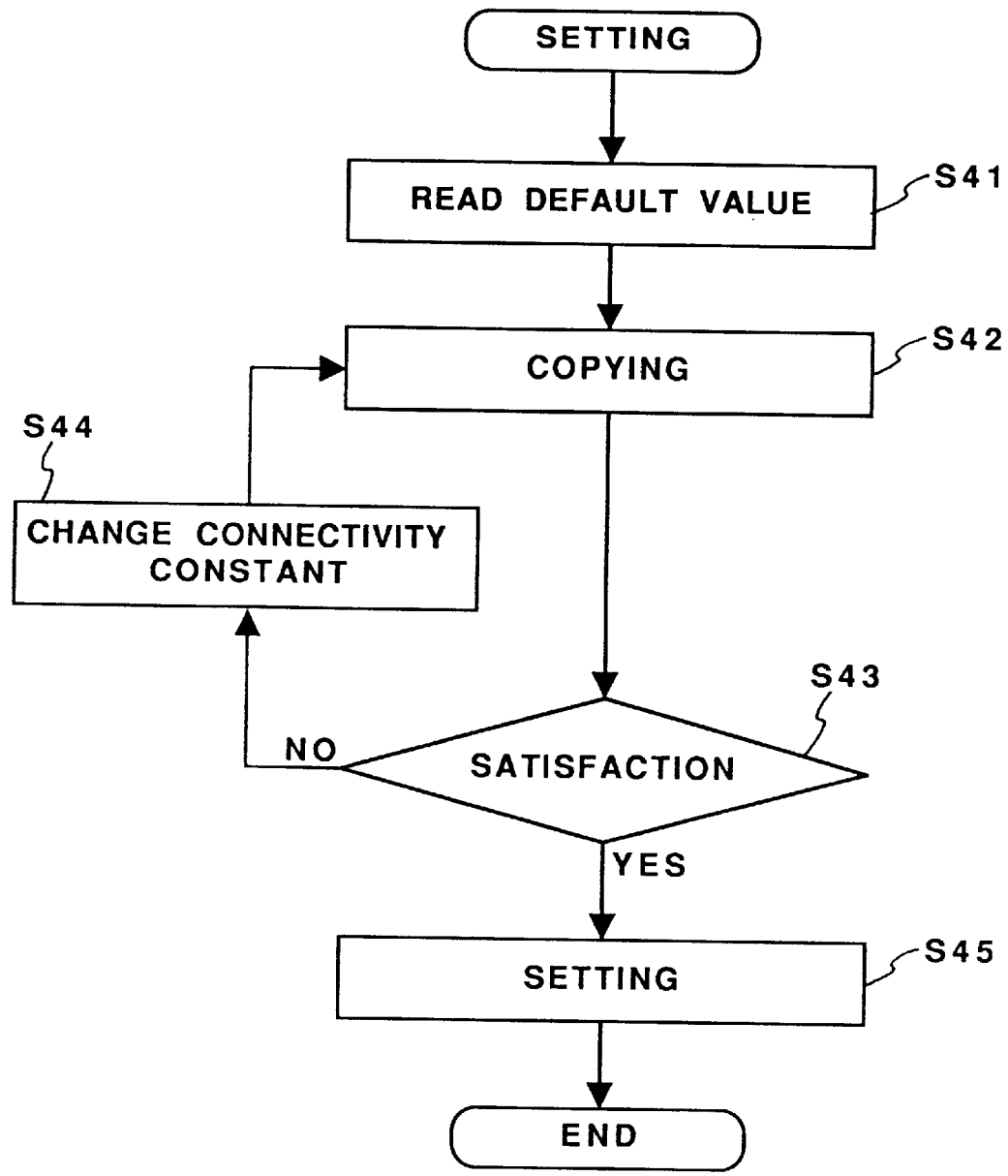
FIG. 4 is a flowchart for discussion of registering and reading the optimum connectivity constants.

In reference to the algorithms of FIGS. 4 and 5, the setting of new optimum connectivity constant and the renewal thereof will be discussed. In step #41, the presently stored values for the optimum connectivity constant are read form the CPU 52. In step #42, a copy is made using the values read from the CPU 52. At step #43, the user can evaluate the copy and decide whether or not it is acceptable. If the answer is no, then step 44 for changing the connectivity constant is performed. In the step, the key on the control panel indicating a desire to change the connectivity constant is pushed. Now, the user can change the connectivity constant by adjusting the yellow, magenta, and cyan color adjuster switches on the control panel of the machine. Then another copy is made in step #42, and the user is again posed with the question of whether or not the copy is sufficient. This time if the answer is yes, in step #45 the new connectivity constant is recorded in the neural network according to the ambient parameters at that time, and the copy process continues.

Figure 5:
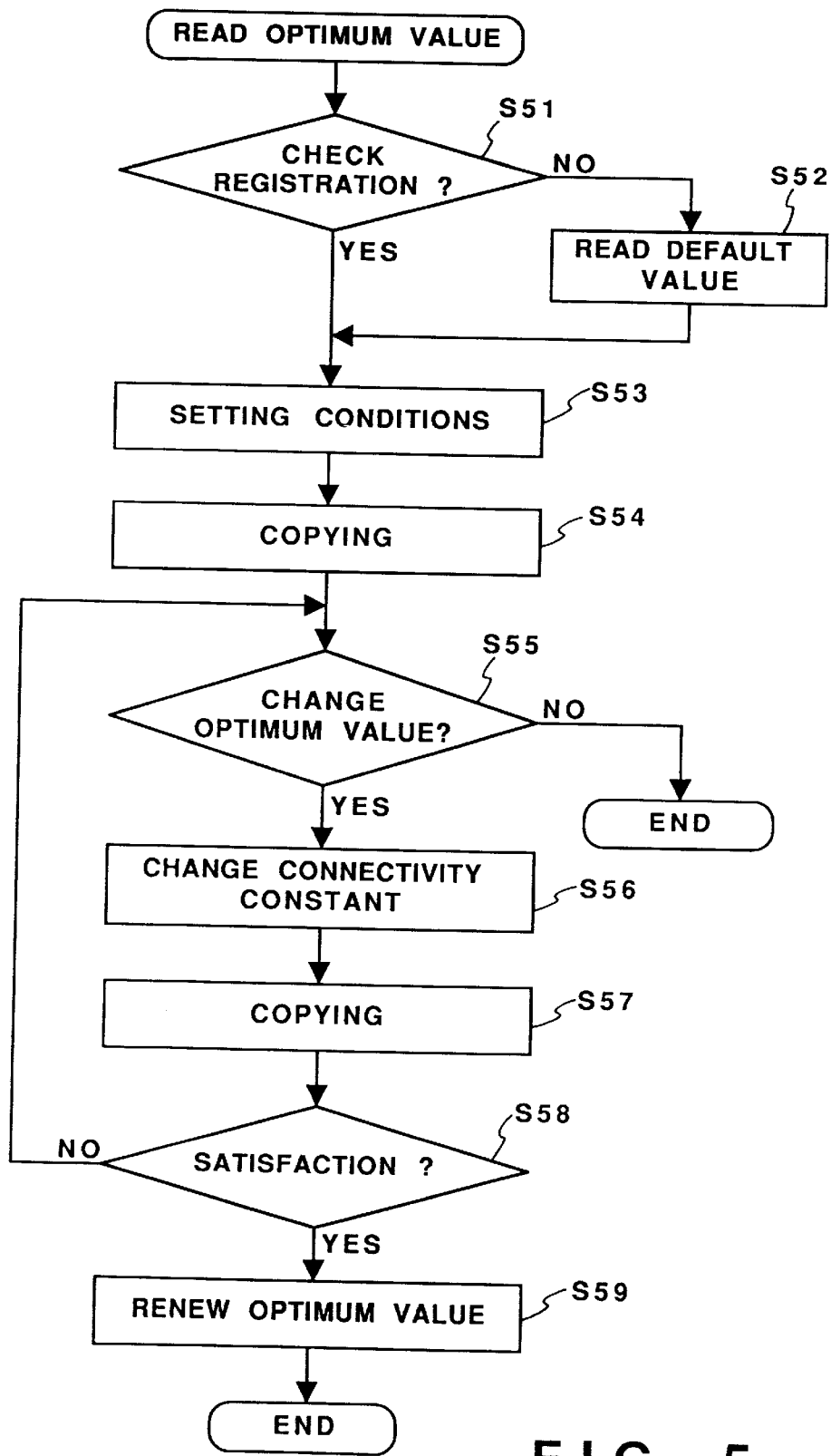
FIG. 5 is a flowchart for discussion of updating the registered optimum connectivity constants.

In FIG. 5 the process for reading the optimum connectivity constant is described in a flowchart. In step 51, whether or not an old connectivity constant is registered is determined. If the answer is no, then the default value form the factory is set. If the answer is yes, then in step 53, that value is read and used for the copy in step 54. In step 55 the user has the chance to examine the copy and is asked whether or not there is a need to adjust the connectivity constant. If the answer is no, then the process finishes and normal copying continues. If the answer is yes, then in step 56 the connectivity process is updated and in step 57 a copy is made from the newly input connectivity constant. In step 58 the user is asked whether or not he is satisfied with the new copy. If the answer is no, then the process returns to step 55 and begins again. If the answer is yes, then the new connectivity constant is stored in step 59. This procedure is followed when the copy machine is turned on or when the density change button is pushed on the control panel.

Figure 6:
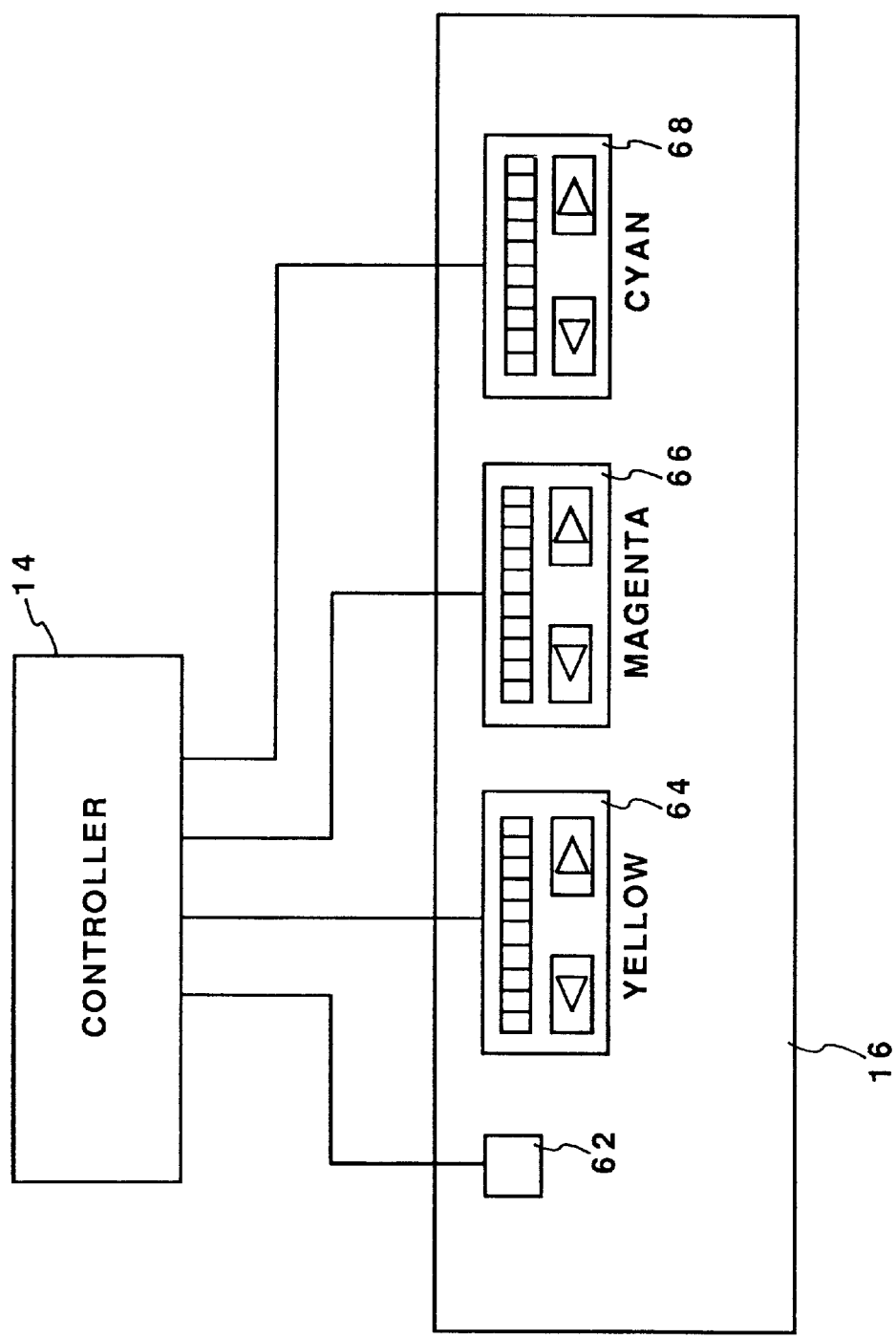
FIG. 6 is a schematic diagram for illustrating the key location on the operation panel.

FIG. 6 is a schematic diagram of the key locations on the operation panel. Key 62 is the key that the operator pushes when he is satisfied with the copy results. When this key is pushed the connectivity constant of that time is stored. This is useful to this specific embodiment of color copiers, because the fine tuning of the color adjustment is very difficult. Thus when the user is satisfied with his adjustments of the color he can freeze it at that point and store the connectivity constant into the machine. The numbers 64, 65, and 66, refer to the adjustment switches for the yellow, magenta, and cyan color densities respectively.

Figure 7:
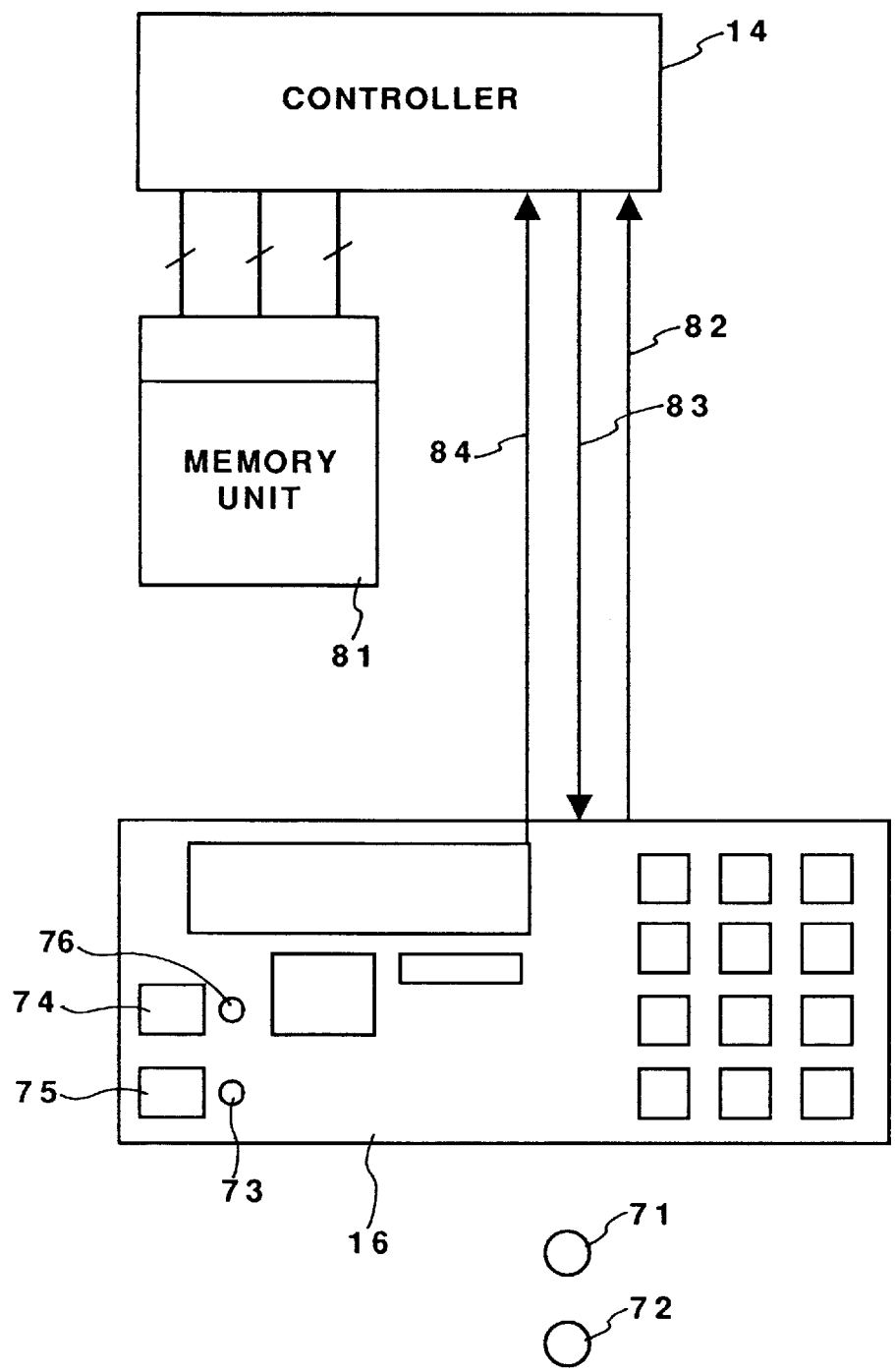
FIG. 7 is also a schematic diagram of the operation panel for illustrating preferred key location.

FIG. 7 represents the preferred embodiment of the user control panel. Key 71 determines the learning mode into which the user can change and save the connectivity constant, or a normal mode which can prohibit the learning option.

Key 72 is the key that will clear the learning history data and return the default factory data. This button will be positioned in an out of the way location to avoid accidental clearing of the learning memory. This button may be used by either a service person or the user if the optimum value has been determined but the ambient conditions have changed requiring the history to be deleted and the default value of the connectivity constant to be used.

Key 73 indicates a LED indicator that lights in response to an inquiry from controller 14 as to whether or not the data from the current run should be stored. The response to this query is Key 74.

Key 74 confirms to the users an update of the running values. If the button is not pushed the auto learning value is registered.

Key 75 is provided for updating the learned values at any time by the user. The controller is told the values when Key 75 is pushed.

If it is assumed that a large software memory capacity is required, such as for back propagation, it should be ROM, and working RAM, is interfaced to the controller 14. According to this embodiment, an expansion memory unit 81 is connected to the controller 14 via control lines, data bus and an address bus. Learning the electrographic process and optimization of such a process are done in the memory unit 81. Due to the utilization of the memory unit 81, having computing the function connected to the controller externally, it is possible to attain a system which has additional functions for performing process control by a neural network. With a properly designed interface, the memory unit can be designed for multiple uses.

Another approach may also be possible. In this approach, a data memory for learning is provided in the controller 14. Learned data is accumulated successively in this memory. This memory is connected to the above mentioned memory unit 81 when a service person visits the user to update the optimum value with the aid of the program stored in the memory unit 81.

The memory unit 81 is referred to as an expansion memory unit, but it may be possible to realize the same by using a microcomputer board. If a microcomputer board is used, work allocation between the controller 14 and microcomputer board becomes possible.

The controller 14 mentioned above is realized by a one-chip microcomputer circuit 100 which will be described hereinafter with reference to FIG. 8.

Figure 8:
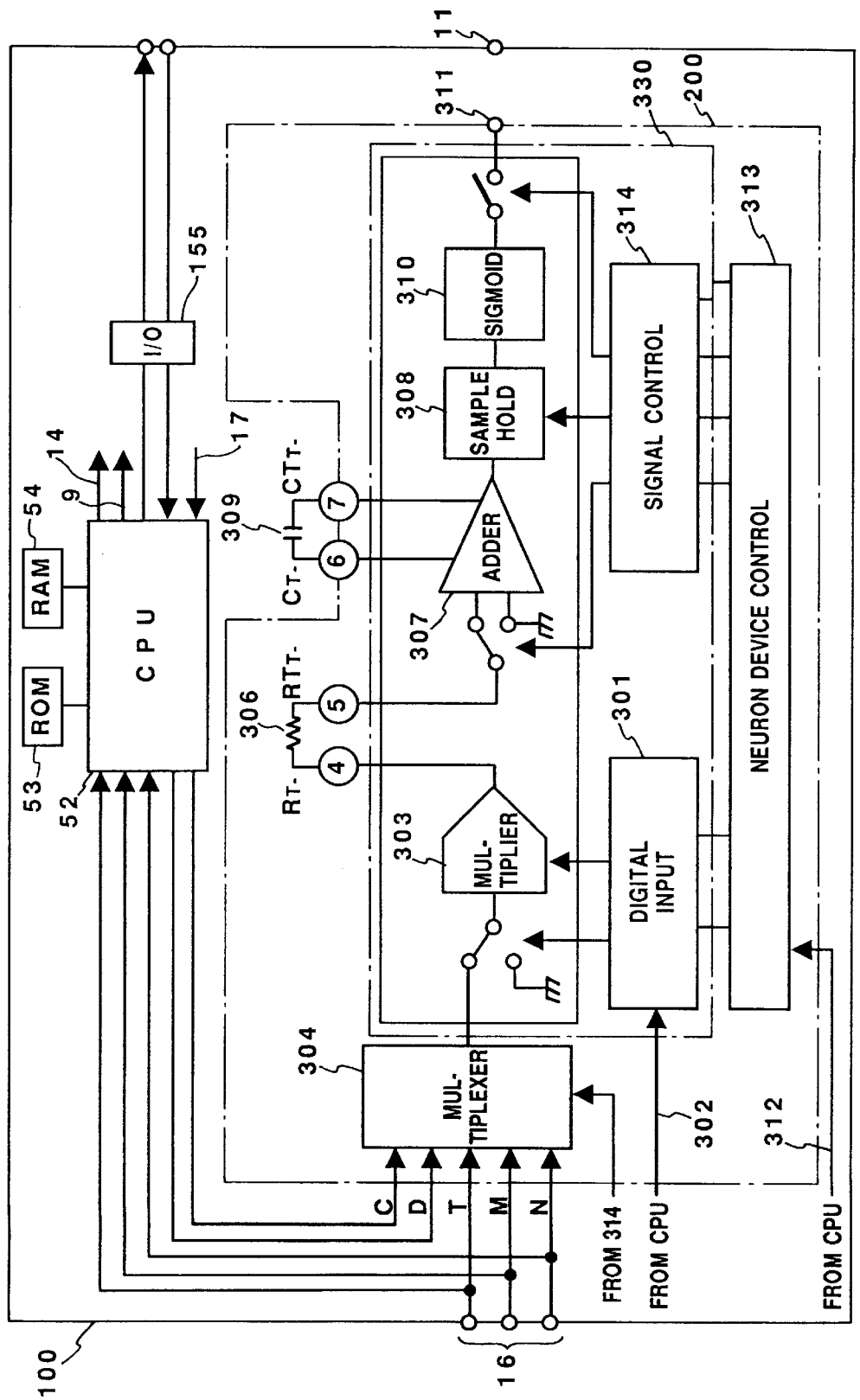
FIG. 8 is a circuit diagram showing an example of a one-chip microcomputer which integrates the circuit arrangement illustrated in FIG. 1.

FIG. 8 is a circuit diagram illustrating the overall arrangement of a microcomputer circuit 100 inclusive of the CPU 52. The CPU 52 includes ALU, ROM 53, RAM 54, and input/output ports for necessary circuitry examples. A 16 bit microcomputer device may be used for the CPU 52. Reference 200 denotes a neuron device such as the neuron-chip which was introduced in the Journal of Nikkei Microdevice of the Mar. 20, 1989 edition as the first commercialized neuron chip which has been made by the bipolar process.

In FIG. 8, a digital signal input circuit 301 stores a weighted digital data from the CPU 52 via a signal line 302.

A multiplier circuit 303 multiplies the weighting data stored in the digital signal input circuit 301 by an analog signal from a multiplexer 303. The multiplexer 303 selects an analog signal from the signals inputted through a plurality of input terminals 16, and outputs to the analog signal to the multiplexer 303. The product thereof is supplied to an adder circuit 307 via a resistance 306. The output of the adder circuit 307 is connected to a sample and hold circuit 308 and a capacitor 309, which is necessary for adding operation, is connected to the outside of the chip 200. The signal which is held in the circuit 308 is inputted to the sigmoid function circuit 310, and an output signal of the sigmoid function circuit 310 is supplied to an output terminal 311. A control signal for controlling the neuron device 210 is supplied from the CPU 52 via signal line 312. The reference numeral 314 denotes a control circuit which drives and controls the adder circuit 307, sample and hold circuit 308, and sigmoid function circuit 310. A control circuit 313 for neuron device controls the multiplexer 304 and all of basic block 330 of the neuron device. As illustrated in the drawing, the CPU 52, ROM 53, RAM 54, I/O port 55, multiplexer 304, the neuron device control circuit 313, and the neuron device basic block 330 are integrated into one semiconductor substrate as a one-chip microcomputer.

A control signal line 14 of FIG. 8 is outputted from the control signal output terminal of the CPU 52, and is supplied to the neuron device as its control signal 312. A control signal 9, which is supplied from the CPU 52, is delivered to the neuron device 200 via the signal line 302. The CPU 52 can deliver the weighted digital data to the digital signal input circuit 301 via the control signal line 9. The output of the sigmoid function circuit 310 is delivered to the CPU 52 via a signal line 7, and also is connected to a signal output terminal 11 of the one-chip circuit 100. The reference numeral 16 denotes a plurality of analog input of the neuron device 200, which is respectively connected to each of analog terminals of the multi input analog multiplexer 304. A capacitor (not shown) being analogous to the capacitor 309 of FIG. 8 is also connected to the adder circuit 307 of the neuron device 200.

The CPU 52 provides a series of the weighted digital data to the digital signal input circuit 301 via the signal line 9. The weighted digital data is multiplied with the analog signal selected by the multiplexer 304 in the multiplier 303, then the product is applied to the adder circuit 309 inclusive of a resistance 306 and the capacitor 309. The added output from the adder circuit 307 is supplied to the sample-hold circuit 308. Then the sigmoid function circuit 310 determines a level of output signal (the threshholding operation) corresponding to the level of signal held at the sample and hold circuit 308 and supplies the output signal to the signal line 311. In case of a plurality of analog signals are supplied to the multiplexor 304, the multiplexer 304 selects a desirable analog signal according to a selection signal 314 from the CPU 52, and the selected analog signal is delivered to the multiplier 303. In this situation, the output of the multiplier 303 is delivered to the adding circuit 303 in a manner of time sharing.

According to the manner described above, the CPU 52 receives the result of the operation from the neuron device 200 via the signal line 7, and then connects it to a digital signal. The result of this arithmetic operation is equivalent to a result of a fuzzy reasoning made under a fuzzy control. When the result of the arithmetic operation is inputted, the CPU 52 determines the state by applying the weighting data which is set at the digital signal input circuit 301, then control signal based on the determination are sent to the objects to be controlled. Of course, the CPU 52 may change the weighting data to be set in the digital signal input circuit 301 through the signal line 9. The application of the information processing circuit illustrated in FIG. 8, which integrated with the single semiconductor and the neural network for controlling the setting of connective constants, is not necessarily limited to use for the image processing, but it may be possible to use for processing information for such goods as electric washers or refrigerators and other electric appliances.

In accordance with the present invention as described above, it is possible to automatically adjust for differences among apparatus, changes with the passage of time, variations in environment, such as ambient temperature and humidity, and modifications in process conditions for different original densities without heavy burden to the controller. Moreover, since it is possible to alter the adjustment level depending upon the preferences of the user, an image which the user always finds satisfactory can be output stably with almost no need to perform adjustment.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   image inputting means for inputting image data from an original which is manually set to be read by said image inputting means;
   image forming means for forming an image corresponding to the original from which the image data is input by said image inputting means; control means for controlling an image forming condition of said image forming means;
   manual input means for manually inputting satisfaction information indicating whether or not an operator is satisfied with a previous image formed by said image forming means;
   accumulation means for accumulating a history of the satisfaction information; and
   renewal means for changing a controlling condition of said control means so as to agree with the operator's taste by adjusting, based on the history of said satisfaction information, connectivity constants of a neural network included in said control means so as to meet operator's satisfaction;
   wherein a series of operations of said image inputting means, said image forming means, said control means, said manual input means, said accumulation means, and said renewal means are repeated.

2. The image forming apparatus according to claim 1, wherein said control means controls the density of said image formed by said image forming means.

3. The image forming apparatus according to claim 1, wherein said manual input means comprises a density adjusting button for increasing or decreasing the density.

4. The image forming apparatus according to claim 3, wherein said density adjusting button is not pressed when the operator is satisfied with said image formed by said image forming means.

5. The image forming apparatus according to claim 1, wherein said control means controls the developing DC bias of said image forming means.

6. The image forming apparatus according to claim 1, wherein said neural network consists of a plurality of layers connected with input connections and output connections.

7. An image processing apparatus according to claim 1, further comprising:
   manual clearing means for clearing the history of said satisfaction information and returning the controlling condition to a default condition.

8. An image processing apparatus according to claim 1, wherein the apparatus has a first mode, in which said accumulation means and renewal means are repeatedly worked, and a second mode, in which said accumulation means and renewal means do not work.

9. An image processing apparatus according to claim 1, wherein said image inputting means includes a scanner for scanning the original image to produce the image data.

10. A process for forming an image comprising:
    a step of inputting image data, by means of image inputting means, from an original which is manually set to be read by said image inputting means;
    a step of forming an image corresponding to the original based on a controlling condition which is previously set;
    a step of manually inputting satisfaction information indicating whether or not an operator is satisfied with a previous image formed based on said image forming condition;
    a step of adding the satisfaction information to a history of said satisfaction information;
    a step of changing the controlling condition of said control means so as to agree with the operator's taste, by adjusting, based on the history of said satisfaction information, connectivity constants of a neural network included in said control means so as to meet operator's satisfaction; and
    a step of repeating a series of said steps of inputting the image data, forming the image, manually inputting the satisfaction information, adding the satisfaction information, and changing the controlling condition.

11. A process for forming an image according to claim 10, further comprising:
    a step of manually clearing the history of said satisfaction information and returning the controlling condition to a default condition.

* * * * *